United States Patent Office 2,944,037
Patented July 5, 1960

2,944,037

INK-TRANSFER COMPOSITIONS AND DUPLICATING MEDIA PREPARED THEREWITH

Ralph H. Clark, Westwood, N.J., assignor to Burroughs Corporation, Detroit, Mich., a corporation of Michigan No Drawing. Filed July 19, 1956, Ser. No. 598,753

13 Claims. (Cl. 260—23)

The present invention relates to improvements in ink-transfer compositions which are eminently suitable for use as ink-transfer coatings for pressure operative duplicating media, such as the kind commonly called "carbon" papers, and to the duplicating media coated with the improved compositions. More particularly, the invention is concerned with film-forming synthetic resin type, as distinguished from wax type, compositions having superior transfer characteristics over the transfer coatings heretofore used.

Up until the past several years, the wax type of transfer coatings were almost exclusively used in the production of carbon papers. Transfer coating compositions of the film-forming synthetic resin type, however, are not a recent discovery, such compositions having been known since at least 1932 as evidenced by Australian Patent No. 10,136 of 1932. This patent disclosed a transfer coating of cellulose esters (e.g. cellulose acetate) carrying oils and coloring matter, and applied to the backing medium from a solvent solution. When subjected to writing pressure, the oils and coloring matter were caused to be transferred from the cellulose acetate film to the copy sheet. Insofar as known, however, transfer media coated with the compositions of this Australian patent have not been successfully commercialized.

In the past several years a transfer paper prepared with another film-forming synthetic resin type of transfer coating has appeared on the market and has met with a good deal of commercial success. The transfer coating of this paper used a vinyl chloride resin consisting of a copolymer of vinyl chloride and vinyl acetate. While this transfer paper had many superior properties over the wax type of carbon papers on the market, it was used exclusively for pencil "carbon" application as it could not meet certain requirements for typewriter "carbons."

An especially important requirement of typewriter carbon paper is that there be a minimum of undesirable offsetting during use, and still produce many sharp and intense copies. By undesirable offsetting is meant the tendency of the transfer paper to leave unwanted marks on the copy sheet when subjected to pressures incidental to use. For example, if pencil "carbons" were used in making copies from a typewriter, the transfer coating would offset under pressure of the feed rolls and would leave feed roll marks on the copy sheet.

Insofar as is known, there have been no carbon papers utilizing transfer coatings of the synthetic resin type which were commercially practical for typewriter applications, up until the present invention.

The compositions of the present invention have been found very useful for preparing duplicating media, such as carbon papers, which meet all the requirements for typewriter applications. Transfer coatings have been prepared which completely eliminate the feed roll marks of the typewriter and which otherwise produce sharper and cleaner copies than any of the synthetic resin type, or wax type, of transfer coatings heretofore known. Such coatings also eliminate the tacky and greasy nature, and the smearing tendencies of the impressions, characteristic of wax type coatings. They can be prepared for any desired write-intensity and have been found to increase manifolding, and especially the wear, properties over the wax type of typewriter carbons.

Not only are the compositions of the invention useful for preparing typewriter "carbons," but they have also been found eminently suitable in preparing pencil "carbons" superior in many of the foregoing properties to even the above-mentioned synthetic resin type of pencil carbon papers now on the market. Another important advantage over the above-mentioned synthetic resin type of pencil "carbons," is that the compositions of the present invention dry in about one-half the time the former compositions required, which permits the use of simpler coating apparatus, and permits it to be driven much faster thereby increasing its output.

An important object of the present invention is to provide a film-forming synthetic resin type of transfer composition for pressure operative duplicating media of the kind useful for typewriter "carbon" applications.

Another object is to provide transfer coatings which produce duplicating media having less undesirable offsetting, and yet equal or superior manifolding, intensity, wear and smear resistant properties than the wax or synthetic resin types of coated media heretofore used.

An additional object is to provide a synthetic resin type of transfer coating which can be "tailored," by varying the proportions or including appropriate modifying ingredients, for almost any typewriter "carbon" application and yet retain minimum acceptable intensity and manifolding properties.

Another object of the invention is to provide such synthetic resin type of transfer coatings which, while eminently suitable for typewriter applications, may also be formulated to possess superior properties for pencil "carbon" applications.

A further object is to provide synthetic resin type transfer compositions which are smoother, drier, less tacky, and less greasy to the touch than any of the transfer compositions heretofore known.

A still further object of the present invention is to provide improving duplicating media prepared with the foregoing synthetic resin type of transfer coatings.

These and additional objects and advantages are attainable by the novel transfer compositions, and duplicating media coated therewith, to be described.

The novel transfer coating compositions of the present invention are generally referred to herein as applied to paper, but it will be understood that they are applicable for other transfer or duplicating media in sheet form, such as plastic film, as well as media in any other form which may be used for transferring or duplicating an impression when subjected to pressure.

Also, while the novel coating compositions are referred to as "transfer" coatings, it will be understood that the film-forming resin constituent of the coating itself, at least in any significant amounts, does not necessarily "transfer" under the "writing" pressure, but rather it is the oil and the coloring matter carried thereby which are caused to exude, or be "squeezed," from the resin which "transfers" to the copy surface. This is to be distinguished from the wax type coatings, and has been found to greatly prolong the usuable life of the duplicating medium produced therewith in that with every transfer of the oil from the area of the coating subjected to the "writing" pressure, the oil and coloring matter remaining in the coating migrate to restore to that area its transferability characteristics.

In accordance with the broader aspects of the invention, the transfer coating compositions are comprised of a uniform mixture containing an acrylic resin selected from the group consisting of polymerized acrylic and methacrylic esters of lower aliphatic alcohols. The acrylic resin has admixed therewith a soluble, compatible, softer resin having a high degree of oil retentivity, preferably a vinyl chloride resin such as used in making the previously referred to pencil carbon paper. The mixture further includes coloring matter, and non-volatile, non-drying liquid plasticizing oils which are sufficiently incompatible with the resins and which are present in sufficient quantity so that the oils migrate within the resins and are expressible therefrom when subjected to pressure. The mixture of the examples disclosed is applied cold (i.e. room temperature) from a solvent solution and the resins are accordingly dissolved in a volatile solvent to reduce the mixture to coatable consistency.

The presence of the acrylic resin has been found to reduce the transferability of the oil and coloring material, and thereby to minimize the extent of undesirable offsetting encountered in making copies. An explanation of this characteristic is probably that the elasticity or flexibility of the acrylic resin is sufficiently low so that under pressures incidental to use of the duplicating medium, the coating is not ordinarily compressed to the degree required for any significant expression of the oil and coloring matter, whereas under a "writing" impact by a typewriter or pressure by a pencil, such expression is effected to produce sharp and clean copies.

The polymers and copolymers of the acrylates and methacrylates which may be used as the acrylic resin constituent are selected from the more soluble esters of lower aliphatic alcohols, such as those containing from one through four carbon atoms. Preferred members of this class are those having a major proportion of polymethyl methacrylate, and especially the copolymers of a major proportion of methyl methacrylate with a minor proportion of ethyl acrylate. One specific example found eminently suitable is "Lucite" 30, which is a product of E. I. du Pont de Nemours and Co., Inc. This material is understood to be comprised of a copolymer of 85-90% methyl methacrylate with 10-15% ethyl acrylate.

It has also been found that additional modifying ingredients may be optionally included to further decrease the tendency of the resin constituent of the coating composition to produce undesirable offsetting, which ingredients presumably act to further decrease the elasticity and flexibility of the acrylic resin. Such modifying ingredients are preferably included, in minor proportions when compared to the total resin content, in transfer coatings for typewriter applications, and may be included in somewhat less proportions in transfer coatings for pencil applications. Ingredients that may be used are those that are harder than the acrylic resin, soluble in the solvent, and have at least limited compatibility with the other resins included in the coating composition. Examples of such modifying ingredients include polystyrene and phenol formaldehyde resins, modified ester gums, and latex emulsions.

It has been found that such modifying ingredients may be included in the novel compositions so as to impart thereto almost any degree of "hardness" that may be required for various commercial typewriter applications and yet retain eminently satisfactory intensity and manifolding properties. In general, where polystyrene resin, phenol formaldehyde resin, or a modified ester gum, is selected, it may be included in amounts up to the limit of its compatibility with the other resins present in the composition, ranging for the most part at about 15% by weight of the total resin content. The preferred latex emulsions that may be used are those containing about 20-60% of a natural or synthetic latex dispersed in water, and may be included up to about 10% by weight of the total resin content.

Coincident with the characteristic of the acrylic resin of reducing undesirable offsetting, especially when one of the above referred to modifying ingredients are added, the acrylic resin also has a tendency of reducing the pressure-sensitivity (i.e. manifolding) properties of the coating and thereby of lessening the number of copies that could be produced simultaneously. It has been found that the addition of the softer compatible resin counteracts this tendency by increasing the pressure-sensitivity of the overall coating.

The latter resin, which is admixed with the acrylic resin, should be softer than the acrylic resin, compatible therewith, soluble in the solvent selected, and must have a high degree of oil-retentivity. It is this latter property, primarily, which contributes to increasing the pressure-sensitivity of the overall transfer coating and thereby the manifolding properties of the coated medium. This softer resin is preferably a vinyl chloride resin. Particularly useful resins are copolymers of at least 80% vinyl chloride with less than 20% of another vinyl ester, preferably vinyl acetate, and/or a vinylidene ester to increase the softness and solubility of the resin. Preferred examples of such resins are copolymers of 85-90% vinyl chloride with 10-15% vinyl acetate, such as those produced by copolymerizing 87% vinyl chloride and 13% vinyl acetate; 86% vinyl chloride, 13% vinyl acetate and 1% maleic acid; and 90% vinyl chloride and 10% vinyl acetate. Copolymers of vinyl chloride and vinylidene chloride possessing similar properties may also be used.

A wide range of transfer coating properties may be obtained for both pencil and typewriter applications by varying the proportions of the above-mentioned softer resin with respect to the total resin content of the coating. The proportions of the softer resin also depend on the specific acrylic resin used and the quantity, if any, the above-mentioned modifying ingredients are included. In compositions having the specific acrylic and modifying resins of the examples set forth below, the amount of the softer resin may be included generally ranges from a minimum of about one part per ten parts of the acrylic resin, up to a maximum of about one part per part of the acrylic resin for typewriter applications, and about one-and-one-half parts per part of the acrylic resin for pencil applications. In other words, the proportions of the resins range from about 1-15 parts of the vinyl resin per 10 parts of the acrylic resin, with about 1-10 parts of the vinyl resin per 10 parts of the acrylic resin being preferred for typewriter applications. The upper limits of the vinyl resin are determined, primarily, by the desired manifolding properties of the transfer medium. In general, as increased amounts of the softer resin will increase the pressure-sensitivity of the coating, and as the pressure-sensitivity is normally desired to be higher for pencil applications, the upper limit is accordingly higher for pencil applications than for typewriter applications. However, this broad range may even be varied, especially in the upper limits, as increased amounts of the modifying "hardening" resins to reduce offsetting will necessitate corresponding increases in the softer resin to maintain desired manifolding properties.

The amount of plasticizing oils varies according to the desired characteristics of the coating and the specific plasticizers selected. In general, increasing the amount of plasticizing oils will increase the write-intensity of the transfer medium. The plasticizing oils constituent as a whole must be sufficiently incompatible with the resins and must be present in sufficient quantity so as to migrate and to exude, or be expressed, from the resins under pressure. This is what characterizes this type of transfer coating composition from a more conventional coating where migration and exudation of the plasticizers are not tolerated. In a transfer coating, however, with which this invention is concerned, it is the exudation or expression of the plasticizers (carrying the coloring matter) under writing or typing pressure that effects the transfer of the impression to the copy surface.

The plasticizing oils constituent is comprised of substantially non-volatile, non-drying, liquid plasticizers which are substantially incompatible (or only partially compatible) with, and insoluble towards, the resins. By "plasticizing oils" as used herein, is meant such constituents (whether a single one or a mixture of many, and whether normally termed "plasticizers," "softeners," or "oils") added to the mixture for purposes of migrating within the resins and being expressible therefrom under pressure as described above. It may optionally include a minor proportion of a compatible plasticizer for the resin, and in fact it has been found that increasing the amount of certain compatible plasticizers permits a decrease in the amount the above-mentioned plasticizing oils are required to effect the exudation from the resins.

Preferred examples of the plasticizing oils that may be used are substantially non-drying, non-volatile, incompatible or partially compatible fatty acids, esters, animal, vegetable, and mineral oils. Illustrative formulations to be described use as an example of each of the above classes, oleic acid, isopropyl palmitate, sperm oil, castor oil, and naphthenic mineral oil, respectively. The plasticizing oils constituent of the transfer coating preferably includes a mixture of two or more of such compounds. Ordinarily, the inclusion of vegetable oils, such as castor oil, tends to increase the proportion of the total oil content to the resins required, whereas the inclusion of a partially compatible ester, such as isopropyl palmitate, or increasing the amount of compatible plasticizer, tends to decrease the required proportion of the plasticizers. Because of the wide variation of transfer characteristics that may be desired, especially write-intensity, and because of the wide variation in plasticizing oils that may be selected, the amount of plasticizing oils can be varied over a broad range. In general, however, the proportion of the plasticizing oil content of the composition, using the specific oils set forth in the examples below, may vary from about three-fourths part to about two-and-one-half parts, by weight, per part of the total resin content.

The coloring matter that may be included in the transfer coating composition may be dyes soluble in the plasticizers, or pigments suspended in the plasticizers. The latter type is much preferable for this particular application as oil soluble dyes have been found to have a much greater tendency for producing undesirable offsetting. For pencil "carbon" applications, blue pigments are preferable, such as alkali blue or ultramarine blue, with suitable toners; and for typewriter "carbon" applications black pigments are preferable such as carbon blacks with suitable toners. The pigments should be selected for lower oil absorption properties and may be included in the composition over a broad range of proportions within workable coating viscosities. In general, the pigments and toners may together comprise about 5–15% by weight of the total composition inclusive of the solvent.

As the coating is applied to the transfer paper in the form of a solution, the composition includes sufficient solvent to reduce the mixture to coatable consistency. Any suitable solvents, with or without diluents, for the resin constituents may be used, such as the ketones, e.g. methyl ethyl ketone, and the esters, e.g. ethyl acetate. The examples set forth below include methyl ethyl ketone, alone, or with toluol. The amount of solvent may generally vary from about three-and-one-half to about five-and-one-half parts, by weight, per part of the total resin content, the specific examples disclosed below containing approximately four parts of the solvent per part of the total resin content.

Illustrative examples of compositions formulated in accordance with the invention are set forth below. Examples for both pencil and typewriter applications are given, and in these particular examples the acrylic resin used is the above-mentioned copolymer of 85–90% methyl methacrylate with 10–15% ethyl acrylate, and the vinyl resin used is a copolymer of 87% vinyl chloride with 13% vinyl acetate.

Example 1

| | Percent by wt. |
|---|---|
| Methyl ethyl ketone | 53 |
| Acrylic resin | 10 |
| Vinyl resin | 2 |
| Blown castor (Pale 170) | 18 |
| Oleic acid | 2 |
| Flexol DOP | 1 |
| Ultramarine blue | 4 |
| Alkali blue paste | 10 |

The coating composition of this example is especially useful for pencil "carbon" applications. Blown castor (Pale 170) is a castor oil (supplied by Baker Castor Oil Co.); Flexol DOP is di octyl (2-ethylhexyl) phthalate plasticizer (product of Carbide and Carbon Chemicals Co.); ultramarine blue is a pigment toner; and alkali blue paste is a pre-mixed pigment and oil suspension consisting of about 40% alkali blue pigment and 60% naphthenic mineral oil.

Example 2

| | Percent by weight |
|---|---|
| Methyl ethyl ketone | 53.5 |
| Acrylic resin | 10.0 |
| Vinyl resin | 4.0 |
| Isopropyl palmitate | 5.0 |
| 91 oil | 5.0 |
| Oleic acid | 1.0 |
| Alkali blue paste | 15.0 |
| Ultramarine blue | 6.0 |
| Bentonite | .5 |

This example is also useful in preparing pencil carbon paper. Although the total amount of plasticizing oils is less than in the preceding example, the write-intensity of the coating was found to be slightly greater than the preceding example. This is believed to be primarily attributable to the use of an organic ester, isopropyl palmitate, as one of the plasticizing oils constituents, which is thought to be partially compatible with the resins, and thereby was found to decrease the total content of plasticizing oils, as mentioned earlier. In addition, the use of a mineral oil (91 oil) rather than the vegetable oil of the preceding example, also permits a decrease in the total amount of plasticizing oils required. Bentonite is a colloidal clay (200 mesh) filler used as an extender for the pigments and as an absorbent for any excess oil, which tends to give a drier coating.

Example 3

| | Percent by wt. |
|---|---|
| Methyl ethyl ketone | 55 |
| Acrylic resin | 6 |
| Vinyl resin | 8 |
| Isopropyl palmitate | 1 |
| 91 oil | 6 |
| Pale 170 castor oil | 6 |
| Sperm oil (poly) | 2.5 |
| Alkali blue paste | 15 |
| ASP clay | 0.5 |

This is another example of a pencil "carbon" composition. It will be noted, however, that in this example the amount of vinyl resin is quite high, exceeding that of the acrylic resin, which results in a coated paper having very good manifolding properties. The proportion of the ester plasticizer, isopropyl palmitate, is much less than in preceding Example 2, which necessitates a larger corresponding increase in the other plasticizing oils. Sperm oil (poly) is an animal oil. ASP clay is an absorbent clay (300 mesh) filler which is also used as an extender for the pigments and as an absorbent for any excess oil, thus producing a drier coating.

Example 4

| | Percent by wt. |
|---|---|
| Methyl ethyl ketone | 48.0 |
| Toluol | 7.0 |
| Acrylic resin | 7.0 |
| Vinyl resin | 5.0 |
| Polystyrene (unmodified) | 1.5 |
| Pale 170 castor oil | 16.0 |
| Oleic acid | 1.5 |
| Flexol DOP | 1.0 |
| Ultramarine blue | 4.0 |
| Alkali blue paste | 9.0 |

While this example is also particularly useful for pencil carbon paper because of the inclusion of blue pigment, it is also suitable for typewriter applications as it is characterized by less offsetting than any of the preceding examples. This is primarily because of the addition of a minor amount of polystyrene, as heretofore discussed. It will also be noted that a larger amount of the vinyl resin is included to increase the pressure-sensitivity of the coating because of the presence of the polystyrene.

Example 5

| | Percent by wt. |
|---|---|
| Methyl ethyl ketone | 54.0 |
| Toluol | 8.0 |
| Acrylic resin | 7.5 |
| Vinyl resin | 6.0 |
| Polystyrene (unmodified) | 2.0 |
| Latex emulsion | .5 |
| Ambrex violet | 5.0 |
| Peerless black | 3.0 |
| Purple toner | 1.0 |
| Sperm oil (bodied) | 7.0 |
| Sperm oil (poly) | 3.0 |
| 91 oil | 3.0 |

This example composition is especially useful in preparing typewriter carbon paper. It will be noted that the polystyrene proportion has been slightly increased and that a minor amount of latex emulsion has been added to further decrease the off-setting of the coating. The latex emulsion used consists of about 33% of a natural rubber latex dispersed in about 67% water. Ambrex voilet is a pre-mixed toner-oil suspension of about 40% violet toner in about 60% naphthenic mineral oil. Peerless black is a form of carbon black pigment, and the sperm oils are both animal oils. It will also be noted that the plasticizer constituent is about equal in weight to the total resin content, which is less plasticizer than any of the preceding examples.

Example 6

| | Percent by wt. |
|---|---|
| Methyl ethyl ketone | 49.0 |
| Toluol | 8.0 |
| Acrylic resin | 7.0 |
| Vinyl resin | 5.0 |
| Polystyrene (unmodified) | 1.5 |
| Peerless carbon black | 4.0 |
| Purple toner | 1.0 |
| Blue toner | .5 |
| Alkali blue paste | 8.0 |
| Sperm oil (bodied) | 9.0 |
| Sperm oil (poly) | 4.0 |
| 91 oil (mineral) | 3.0 |

This is another example of a coating especially useful for typewriter carbon paper of slightly greater intensity and slightly better manifolding properties than the preceding example. This is attributable to the increase in the oils and vinyl resin proportions, respectively. It will be noted that the polystyrene proportion is slightly less than in the preceding example, and also that the latex emulsion is not included.

In preparing the foregoing compositions, the coloring matter and plasticizers are preferably first mixed with a small amount of the solvent in a pebble mill until the pigments are well dispersed. To this is added separate solvent solutions of the acrylic resin and the vinyl resin, and then mixed in an explosion-proof mixer.

The coated composition may be applied to the transfer medium by any suitable coating technique. Preferably, the coating is applied by an unheated doctoring roll in a reverse roll type of coating apparatus, the coated medium then passing through a heated tunnel to evaporate the solvent. As mentioned earlier, one of the advantages of the foregoing compositions over the polyvinyl chloride-acetate type of synthetic resin transfer coating heretofore used is that the coating dries in about one-half the time previously required, which simplifies the drying equipment and permits the apparatus to operate at faster coating speeds.

Before the foregoing compositions are coated on the backing medium, such as a paper web, the web is first undercoated with a resin solution which is preferably one of the resins included in the coating composition. Two examples of undercoating compositions are:

Example A

| | |
|---|---|
| Vinyl resin | 20 |
| Methyl ethyl ketone | 78 |
| Dioctyl phthalate | 2 |

Example B

| | |
|---|---|
| Acrylic resin | 20 |
| Methyl ethyl ketone | 78 |
| Dioctyl phthalate | 2 |

In the foregoing examples of undercoating compositions, the parts are by weight, and the acrylic and vinyl resins are both the same materials used in the preceding six examples.

In coating paper with the foregoing transfer compositions, a wider variation of coating thicknesses is permissible than in the wax type of compositions heretofore used. The wear, or life, of the coated duplicating paper depends to a large extent on the thickness of the coating, and it has been found that not only do the foregoing compositions impart superior durability characteristics than the wax coatings of equal thickness, but also that the foregoing compositions may be coated to greater thicknesses than the wax coatings, which thereby increases the life of the duplicating paper up to four times the life of commercially available wax carbon papers.

In the foregoing examples, considering a ream of 8½" x 13" x 500 sheets, the coating weights may range from about ½ lb. (for one time use) up to about 2½ lbs. This compares to a maximum coating weight of about 1½ lbs. for the wax type of transfer coatings. The preferred coating weights range from about 2 lbs. to about 2¼ lbs. producing coating thicknesses (dry) from about ¾ mil to about 1 mil.

As mentioned above, in all the preceding six examples the acrylic resin used is a copolymer of 85–90% methyl methacrylate with 10–15% ethyl acrylate. Although this copolymer is preferable because of its high solubility and because it is presently easily commercially available, the acrylic resin constituent may be selected from any of the more soluble polymers and copolymers of acrylic and methacrylic esters of lower aliphatic alcohols. For example, coating compositions have been prepared using polymethyl methacrylate admixed with the same vinyl resin as included in the above examples, the latter resin being present in about one part per three parts of the acrylic resin. The coating so produced was satisfactory for some typewriter "carbon" applications, but not as good as some of the preceding examples. Also, as the solubility of polymethyl methacrylate is not as high as the copolymer used in the foregoing examples, the instant composition required constant agitation before the coating was applied to the transfer paper as the acrylic resin tended to precipitate from the solution.

Also, as mentioned above, the vinyl resin admixed with the acrylic resin in the above six examples was a copolymer of 87% vinyl chloride with 13% vinyl acetate. While this particular material is also eminently suitable for this application because it is softer than the acrylic resin, compatible therewith, soluble in the solvent selected, and has a high degree of oil-retentivity, many other materials having these properties may also be used, preferably a vinyl chloride resin of at least 80% vinyl chloride copolymerized with other vinyl esters or vinylidene esters to increase the solubility and softness of the composition.

Other modifications, variations and equivalents will be readily apparent to those skilled in the synthetic resin coating art which are intended to be included in the scope of the invention as defined in the following claims.

I claim:

1. In an ink-transfer composition comprising a uniform mixture of a solid synthetic resin comprising a vinyl chloride resin, a non-volatile, non-drying liquid sufficiently incompatible with the resin and present in sufficient quantity to migrate within the resin and to be expressible therefrom under pressure, and coloring matter, which composition is operative to transfer ink when subjected to pressure by the expression from the resin of the non-volatile, non-drying liquid carrying the coloring matter; the improvement wherein said solid synthetic resin also includes an acrylic resin selected from the group consisting of polymerized acrylic and methacrylic esters of lower aliphatic alcohols.

2. In a duplicating article comprising a backing member having on a surface thereof a coating of an ink-transfer composition comprising a uniform mixture of a solid synthetic resin comprising a vinyl chloride resin, a non-volatile, non-drying liquid sufficiently incompatible with the resin and present in sufficient quantity to migrate and to be expressed from the resin under pressure, and coloring matter, which composition is operative to transfer ink to a copy-receiving surface when subjected to pressure by the expression from the resin to the copy-receiving surface of the non-volatile, non-drying liquid carrying the coloring matter; the improvement wherein said solid synthetic resin also includes an acrylic resin selected from the group consisting of polymerized acrylic and methacrylic esters of lower aliphatic alcohols.

3. In a duplicating article comprising a backing member having on a surface thereof a coating of an ink-transfer composition comprising a uniform mixture of a solid synthetic resin including a copolymer of at least 80% vinyl chloride with less than 20% vinyl acetate, a non-volatile, non-drying liquid sufficiently incompatible with the resin and present in sufficient quantity to migrate and to be expressed from the resin under pressure, and coloring matter, which composition is operative to transfer ink to a copy-receiving surface when subjected to pressure by the expression from the resin to the copy-receiving surface of the non-volatile, non-drying liquid carrying the coloring matter; the improvement wherein said solid synthetic resin also includes an acrylic resin comprising a copolymer of 85–90% methyl methacrylate with 10–15% ethyl acrylate.

4. A duplicating article comprising a backing member having on a surface thereof a coating of an ink-transfer composition operative to transfer ink to a copy-receiving surface when subjected to pressure, said ink-transfer composition comprising a uniform mixture of an acrylic resin selected from the group consisting of polymerized acrylic and methacrylic esters of lower aliphatic alcohols containing from 1 to 4 carbon atoms, a vinyl resin comprising a copolymer of at least 80% vinyl chloride with less than 20% vinyl acetate, said vinyl resin being present from about 1 to 15 parts by weight per 10 parts of said acrylic resin, a non-volatile, non-drying liquid sufficiently incompatible with said resins and present in sufficient quantity to migrate within said resins and to be expressible therefrom under pressure, and coloring matter carried by said non-drying liquid for expression therewith under pressure.

5. A duplicating article as defined in claim 4 wherein said acrylic resin is a copolymer of methyl methacrylate with ethyl acrylate.

6. A duplicating article comprising a backing member having on a surface thereof a coating of an ink-transfer composition operative to transfer ink to a copy-receiving surface when subjected to pressure, said ink-transfer composition comprising a uniform mixture of an acrylic resin comprising a copolymer of 85–90% methyl methacrylate with 10–15% ethyl acrylate, a vinyl resin comprising a copolymer of at least 80% vinyl chloride with less than 20% vinyl acetate, said vinyl resin being present from about 1 to 15 parts by weight per 10 parts of said acrylic resin, a non-volatile, non-drying liquid sufficiently incompatible with said resins and present in sufficient quantity to migrate within said resins and to be expressible therefrom under pressure, and coloring matter carried by said non-drying liquid for expression therewith under pressure.

7. A duplicating article comprising a backing member having on a surface thereof a coating of an ink-transfer composition operative to transfer ink to a copy-receiving surface when subjected to pressure, said ink-transfer composition comprising a uniform mixture of an acrylic resin comprising a copolymer of 85–90% methyl methacrylate with 10–15% ethyl acrylate, a vinyl resin comprising a copolymer of 85–90% vinyl chloride with 10–15% vinyl acetate, said vinyl resin being present from about 1 to 15 parts by weight per 10 parts of said acrylic resin, a non-volatile, non-drying liquid sufficiently incompatible with said resins and present in sufficient quantity to migrate within said resins and to be expressible therefrom under pressure, and coloring matter carried by said non-drying liquid for expression therewith under pressure.

8. A duplicating article as defined in claim 4 wherein said vinyl resin is present from 1 to 10 parts per 10 parts of said acrylic resin.

9. A duplicating article as defined in claim 4 wherein the ink-transfer composition further includes a quantity of polystyrene up to about 15% by weight of the total resin content.

10. A duplicating article as defined in claim 4 wherein the ink-transfer composition further includes a natural rubber latex up to about 10% by weight of the total resin content.

11. A coating composition for preparing pressure-operative transfer coatings on duplicating media comprising a uniform mixture including a copolymer of 85–90% methyl methacrylate with 10–15% ethyl acrylate, a copolymer of 85–90% vinyl chloride with 10–15% vinyl acetate present from 1 to 15 parts by weight per 10 parts of said first-mentioned copolymer, a non-volatile, non-drying liquid substantially incompatible with said resins and present from about ¾ to 2½ parts by weight per part of the total resin content, coloring matter carried by said non-drying liquid, and a volatile solvent for the resins sufficient to reduce the mixture to coatable consistency.

12. A composition as defined in claim 11 wherein the last-mentioned copolymer is present from 1 to 10 parts by weight per 10 parts of the first-mentioned copolymer, and wherein the coloring matter comprises about 5–15% by weight of the total composition inclusive of the solvent.

13. A duplicating article comprising a backing member having on a surface thereof a coating of a pressure-operative transfer composition comprising a uniform mixture of a copolymer of 85–90% methyl methacrylate with 10–15% ethyl acrylate, a copolymer of 85–90% vinyl chloride with 10–15% vinyl acetate present from 1 to 10 parts by weight per 10 parts of said first-mentioned copolymer, a non-volatile, non-drying liquid substantially incompatible with said resins and present from ¾ to 2½ parts by weight per part of the total resin content, and coloring matter carried by said non-drying liquid.

References Cited in the file of this patent

UNITED STATES PATENTS

| | | |
|---|---|---|
| 1,830,980 | Carr | Nov. 10, 1931 |
| 1,847,539 | Sabin | Mar. 1, 1932 |
| 2,084,386 | Crawford | June 22, 1937 |
| 2,097,754 | Bradshaw | Nov. 2, 1937 |
| 2,153,324 | Bjorksten | Apr. 4, 1939 |
| 2,254,072 | Jenkins | Aug. 26, 1941 |
| 2,311,249 | Powell | Feb. 16, 1943 |
| 2,413,259 | Soday | Dec. 24, 1946 |
| 2,713,006 | Hunter | July 12, 1955 |
| 2,810,661 | Newman | Oct. 22, 1957 |
| 2,820,717 | Newman | Jan. 21, 1958 |

FOREIGN PATENTS

| | | |
|---|---|---|
| 278,953 | Switzerland | Nov. 15, 1949 |
| 392,220 | Great Britain | May 15, 1933 |